C. N. HUDSON.
POWER TRANSMISSION DEVICE.
APPLICATION FILED SEPT. 14, 1918.

1,300,169.

Patented Apr. 8, 1919.

INVENTOR
CHARLES N. HUDSON
BY
Frank Warren
ATTORNEY

UNITED STATES PATENT OFFICE.

CHARLES N. HUDSON, OF SEATTLE, WASHINGTON.

POWER-TRANSMISSION DEVICE.

1,300,169.  Specification of Letters Patent.  Patented Apr. 8, 1919.

Application filed September 14, 1918. Serial No. 254,377.

*To all whom it may concern:*

Be it known that I, CHARLES N. HUDSON, a citizen of the United States, residing at Seattle, in the county of King and State of Washington, have invented a certain new and useful Improvement in Power-Transmission Devices, of which the following is a specification.

My invention relates to improvements in power transmission devices and the object of my invention is to provide a friction device of a simple and efficient form of construction that is adapted for establishing a driving connection between two adjacent drums or disks.

A further object of my invention is to provide suitable means for controlling the operation of the friction members.

My invention consists in the novel construction of power transmission devices and in the novel method of controlling the operation of such devices as will be more clearly hereinafter described and claimed.

In the accompanying drawings Figure 1 is a view in side elevation of a transmission device constructed in accordance with my invention;

Figure 1:
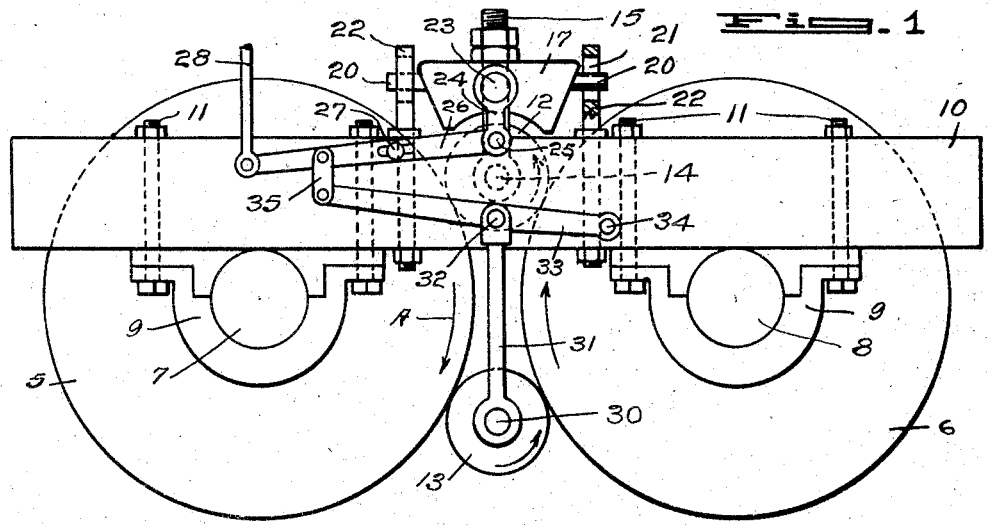
Figure 2:
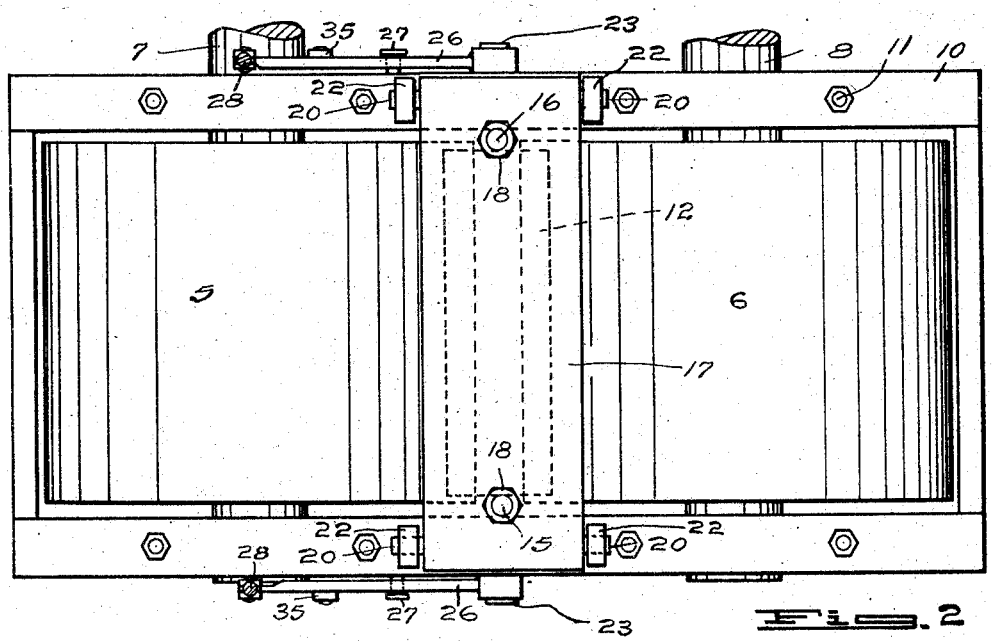
Fig. 2 is a plan view of the same.

Referring to the drawings, throughout which like reference numerals indicate like parts, the numerals 5 and 6 designate two large drums or rollers that are provided with axial pivots 7 and 8 respectively which are journaled in bearings 9 that are secured to a rectangular frame 10 by bolts 11 in such a manner that the peripheral portions of the drums are spaced a short distance from each other at their closest point which will be on a plane passing through the centers of the two drums.

Operatively disposed between the two drums 5 and 6 at points above and below a plane passing through the centers of the drums are two rollers 12 and 13 that are each of a diameter not to exceed one fourth of the diameter of the drums and that engage with the peripheral portions thereof to transmit rotary motion from one to the other of the drums.

The roller 12 is provided on its ends with axial pivots 14 that are journaled in the lower portions of links 15 and 16 that pass upwardly through a block 17 and are adjustably secured thereto by nuts 18.

The block 17 extends crosswise of the frame 10 and is provided near each end with fixed pins 20 that project outwardly from the sides of the block 17 into slots 21 in guide members 22 that are fixedly secured to the frame 10 and project upwardly therefrom.

Both ends of the block 17 are connected by pivots 23 with the top ends of links 24. The bottom ends of the links 24 are connected by pivots 25 with the inner ends of lever arms 26 that are fulcrumed on pivots 27 and articulated at their outer ends with operating links 28 by means of which the lever arms may be oscillated on the fulcrum pivots 27 to lift the roller 12 out of engagement with the drums 5 and 6.

The lower roller 13 is provided on both ends with axial pivot pins 30 that are journaled in the lower ends of links 31 that are articulated by pivots 32 with the medial portions of lever arms 33. The lever arms 33 are each pivoted at one end on fixed pins 34 on the frame 10 and are articulated at their opposite ends with short links 35 that are pivotally secured to the lever arms 26 so that when the outer ends of the lever arms 26 are raised the roller 13 will be lifted into engagement with the drums 5 and 6.

When the device is in use one of the drums is necessarily connected with a source of power by which it may be driven and the outer drum is driven by power communicated to it from the first drum through the rollers 12 and 13.

If the drum 5 is driven in a clockwise direction as indicated by the arrow A and the rollers 12 and 13 are held firmly in engagement with the drums 12 and 13 by exerting a lift on the end of the lever arm 26 then the rollers 12 and 13 will be rotated in a contra-clockwise direction and the drum 6 will be driven by such rollers in a clockwise direction.

If the drum 5 is driven in a contra-clockwise direction or if the drum 6 is driven in either direction it is obvious that the rollers 12 and 13 will operate in the same manner to drive the opposite drum, the direction of rotation of the two drums always being the same and always being opposite to the direction of rotation of the rollers.

The top roller 12 may be adjusted by turning the nuts 18 so that the rollers 12 and 13 will engage the drums 5 and 6 with equal pressure when the end of the lever arm 26 is lifted.

It has been found by experiment that my transmission will not operate successfully if the diameter of the roller is more than one-fourth of the diameter of the driving drum.

My device is especially well adapted for driving drums whereon cable may be wound the rollers of which being disposed so that they will engage with the end flanges of the drums.

Figure 3:
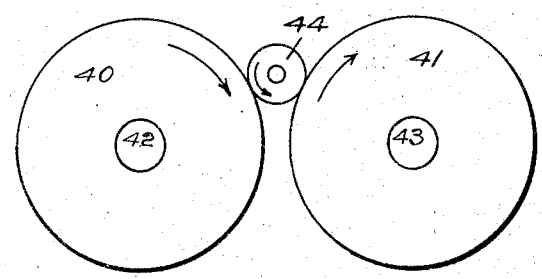
Fig. 3 is a somewhat diagrammatic view in side elevation illustrating a simple form of my invention.

Fig. 3 illustrates a simple form of transmission of this type which consists of two rollers 40 and 41 that may be mounted for rotation, adjacent each other on pivots 42 and 43 and are adapted to have a loose roller 44 dropped between them to form a frictional driving member as shown.

When the drum 40 is driven in a clockwise direction the roller 44 and drum 41 will be driven in the directions indicated by the arrows.

The diameter of the roller 44 will necessarily not be greater than one fourth of the diameter of the driving drum 40 regardless of the diameter of the driven drum.

If the drum 40 is driven in a contra-clockwise direction the device shown in Fig. 3 will be inoperative to drive the drum 41 owing to the fact that the roller 44 is not held in position except by gravity.

It will be readily seen that by a simple duplication of parts any number of drums may be driven.

It is obvious that changes in the form of construction of the various parts of the power transmission herein shown may be resorted to within the scope of the following claim.

What I claim is:

A device of the class described, comprising a frame, two drums rotatably mounted therein in side by side relation the peripheral portions of said drums being spaced apart, a roller adapted to be inserted between said drums on the top sides thereof, a member extending crosswise of said frame above said roller, means adjustably secured to said member for supporting said roller for rotation, devices supporting said member for vertical movement with respect to said frame, links pivotally connected with the outer ends of said member, lever arms fulcrumed on said frame and articulated with the lower ends of said links, means for raising and lowering the outer ends of said lever arms, another roller adapted to be inserted between said drums on the bottom side thereof, other lever arms pivotally secured at the inner end of said frame, links connecting the outer ends of said other lever arms to said first named lever arms, and links connecting said last named roller with the medial portions of said last named lever arms whereby said first named roller and said last named roller may be moved into and out of engagement with said drums simultaneously.

In witness whereof, I hereunto subscribe my name this 7th day of September, A. D. 1918.

CHARLES N. HUDSON.

Copies of this patent may be obtained for five cents each, by addressing the "Commissioner of Patents, Washington, D. C."